United States Patent [19]

Langer, Jr.

[11] 4,145,313

[45] Mar. 20, 1979

[54] NOVEL TRIALKYL ALUMINUM COCATALYST

[75] Inventor: Arthur W. Langer, Jr., Watchung, N.J.

[73] Assignee: Exxon Research & Engineering Co., Florham Park, N.J.

[21] Appl. No.: 812,530

[22] Filed: Jul. 5, 1977

Related U.S. Application Data

[63] Continuation-in-part of Ser. No. 790,832, Apr. 25, 1977, and a continuation-in-part of Ser. No. 790,837, Apr. 25, 1977.

[51] Int. Cl.² ............................. C08F 4/64; C08F 4/68
[52] U.S. Cl. ................................ 252/429 B; 526/139; 526/141; 526/142
[58] Field of Search ...................... 252/429 B, 429 C

[56] References Cited

U.S. PATENT DOCUMENTS

| | | | |
|---|---|---|---|
| 3,888,789 | 6/1975 | Dombro et al. | 252/429 B |
| 3,953,414 | 4/1976 | Galli et al. | 252/429 C X |
| 3,992,322 | 11/1976 | Dombro et al. | 252/429 B |

FOREIGN PATENT DOCUMENTS

| | | | |
|---|---|---|---|
| 845593 | 2/1977 | Belgium | 252/429 B |
| 1335887 | 10/1973 | United Kingdom | 252/429 B |

*Primary Examiner*—Patrick Garvin
*Attorney, Agent, or Firm*—R. E. Nanfeldt

[57] ABSTRACT

A new improved catalyst system for alpha-olefin type polymerizations, includes at least one metal alkyl compound having the formula $R_nMR'_{3-n}$ in combination with a Group IVB-VIII transition metal compound on a support and at least one Lewis base wherein R is selected from the group consisting of $C_3$ to $C_{20}$ secondary or tertiary alkyl, cycloalkyl, alkenyl or aralkyl groups; R' is selected from the group consisting of $C_1$ to $C_{20}$ primary alkyl, alkenyl or aralkyl groups, or a hydride, M is selected from the group consisting of aluminum, gallium, or indium; and n = 1–3. The improved catalyst system provides polymers having increased isotactic stereo-regularity as well as lower catalyst residue.

31 Claims, No Drawings

NOVEL TRIALKYL ALUMINUM COCATALYST

CROSS REFERENCES TO RELATED APPLICATIONS

The present application is a CIP of U.S. Application Ser. No. 790,832 and 790,837 filed on Apr. 25, 1977.

BACKGROUND OF THE INVENTION

1. Field of the Invention

A new improved catalyst system for alpha-olefin type polymerizations includes at least one metal alkyl compound having the formula $R_nMR'_{3-n}$ in combination with a Group IVB-VIII transition metal compound on a support and at least one Lewis base wherein R is selected from the group consisting of $C_3$ to $C_{20}$ secondary or tertiary alkyl, cycloalkyl, alkenyl, or aralkyl groups; R' is selected from the group consisting of $C_1$ to $C_{20}$ primary alkyl, alkenyl or aralkyl groups, or a hydride, M is selected from the group consisting of aluminum, gallium or indium; and n = 1-3. The improved catalyst system provides polymers having increased isotactic stereoregularity as well as lower catalyst residue.

2. Description of the Prior Art

There is extensive art on the polymerization of ethylene and higher alpha-olefins, including dienes, using Ziegler type catalysts containing either alkyl metals or alkyl metals in which an alkyl group has been replaced by X, OR'', SR'', NR''$_2$, etc., in combination with a transition metal compound of Groups IVB-VIII, where X = halide, and R'' = $C_1$ to $C_{20}$ hydrocarbyl substituent.

It is well known to use various alkyl aluminum compounds in combination with transition metal compounds of Groups IVB-VIII in Ziegler-type polymerizations of alpha olefins. For stereospecific polymerization of propylene and higher alpha olefins, the most effective commercially used alkyl metal compounds are AlEt$_3$ and AlEt$_2$Cl, although Al(n-Pr)$_3$, Al(n-Bu)$_3$, Al(i-Bu)$_3$ and Al(iBu)$_2$H give similar results. Longer chain alkyl aluminums, such as Al(n-C$_6$)$_3$, Al(n-C$_8$)$_3$, (n-C$_8$)$_2$AlCl, etc., drastically reduce stereospecificity as shown by much lower heptane insolubles (Ziegler and Montecatini, Belgian Pat. No. 543,259). Thus it was surprising to find that larger secondary and tertiary alkyl groups produced higher stereospecificity in this invention.

This invention claims novel, improved alkyl metal cocatalysts for use with Groups IVB-VIII transition metal compounds for stereospecific polymerization of propylene and higher alpha olefins. The new cocatalysts are triorgano metal compounds of aluminum, gallium or indium which contain at least one secondary or tertiary alkyl group. These cocatalysts yield higher activity and/or isospecificty than the conventional primary di- or tri-alkyl metal compounds when used in combination with the various types of supported transition metal catalysts, such as MgCl$_2$-supported TiCl$_4$, supported TiCl$_3$, etc., with or without other catalyst modifiers present, such as Lewis bases, alcohols, phenols, polymers, dispersants, binders and other additives.

A number of patents have been issued on the use of trialkyl metal compounds as cocatalyst for the polymerization of various monomers. However, these patents fail to teach, imply or infer the inventive concept of having at least one, preferably two, secondary or tertiary alkyl groups in the trialkyl metal compound in order to be able to achieve both increased polymerization activity and improved isotacticity of the resultant polymer when used in combination with supported transition metal catalysts. These patents which are non applicable to the instant invention are U.S. Pat. No. 3,953,414, Belg. Pat. Nos. 845,593, 846,314, Ger. DT No. 2620-886, Brit. Pat. No. 1,335,887, Ger. DT No. 2630-585, Brit. Pat. No. 1,140,659, Ger. DT No. 2612-650, South Africa Pat. No. 7,503,470, Ger. DT No. 2355-886, Jap. Pat. No. 51064-586, South Africa Pat. No. 7507-382, Ger. DT No. 2638-429, Jap. Pat. No. 51057-789, U.S. Pat. No. 3,992,322, Jap. Pat. No. 52027-090, and U.S. Pat. No. 3,400,110.

SUMMARY OF THE INVENTION

The present invention relates to unique and novel catalyst systems for the conventional alpha-olefin type polymerization at significantly improved polymerization activity, wherein the resultant polymers have a high degree of isotactic stereoregularity.

An object of my present invention is to provide improved catalyst systems having a major increase in polymerization activity while being able to control over a wide range of polymer crystallinity, e.g. isotacticity, wherein the catalyst system includes a transition metal compound and a metal trialkyl compound of Al, Ga or In having at least one secondary or tertiary alkyl group.

A further object of my present invention is to provide an improved process for alpha-olefin type polymerizations, wherein the polymerization activity is increased and the formed polymer has a high degree of isotactic stereoregularity and a minimum amount of catalyst residues are formed.

A still further object of my present invention is to use directly the new improved catalyst with various types of supported transition metal compounds without substantial modification of the commercial catalyst preparation or the polymerization plant.

A still further object of my present invention is to provide new improved catalyst compositions wherein the isotacticity of the formed polymer is much less sensitive to a ratio of the cocatalyst (trialkyl metal compound) to the transition metal compound than when the corresponding primary alkyl compounds are used, thereby greatly facilitating process control to make higher quality polymers at more efficient production rates.

Additionally, another object of the present instant invention is to provide a process and compositions whereby $R MR'_2$ or $R_2MR'$ are produced as cocatalysts in situ by the reactions:

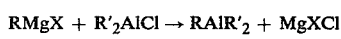

GENERAL DESCRIPTION

It is well known in the art to use an alkyl metal compound of Groups I-III in combination with a transition metal compound of Groups IVB-VIII as a catalyst system for olefinic polymerization. While nearly all of the alkyl metal compounds are effective for the polymerization of ethylene, only a few are effective for the preparation of isotactic polymers of propylene and higher alpha-olefins and only Et$_2$AlCl, AlEt$_3$ and i-Bu$_2$AlH have any important commercial utility.

A major cost involved in the polymerization of the alpha-olefins is the cost of the catalyst components. Therefore, the cost of the manufacture of the polymer can be effectively reduced by the use of catalyst systems having a higher polymerization activity. A further concern is the ability to produce polymers having a minimum amount of catalyst residues thereby eliminating a costly deashing operation. A still further concern is the ability to produce polymers having a high degree of isotactic stereoregularity thereby enabling the manufacturer to eliminate or reduce the costly operation involving the removal and separation of atactic polymer from the isotactic polymer. The improved catalyst system of the present instant invention provides a means to the manufacturer of obtaining these desirable realizations.

The improved catalyst systems of the present invention which are employed in alpha-olefin polymerizations include a Group IVB-VIII transition metal compound, one or more Lewis bases, and at least one metal alkyl compound at least one of which is a metal trialkyl compound of Al, Ga or In, wherein at least one of the alkyl groups is selected from the group consisting of $C_3$ to $C_{20}$ secondary or tertiary alkyl, cycloalkyl, alkenyl or aralkyl groups.

The transition metal catalyst compound is a Group IVB-VIII transition metal halide, wherein the halide group is chloride or bromide and the transition metal halide is in the form of solid crystalline compounds, solid solutions or compositions with other metal salts or supported on the surface of a wide range of solid supports. For highest stereospecificity it is desirable to have the transition metal halide, or its support composition, in the layer lattice structure with very small crystallites, high surface area, or sufficient defects or foreign components to facilitate high dispersion during polymerization. The transition metal halide may also contain various additives such as Lewis bases, pi bases, polymers or organic or inorganic modifiers. Vanadium and titanium halides such as $VCl_3$, $VBr_3$, $TiCl_3$, $TiCl_4$, $TiBr_3$ or $TiBr_4$ are preferred, most preferably $TiCl_3$ or $TiCl_4$ and mixtures thereof. The most preferred $TiCl_3$ compounds are those which contain $TiCl_4$ edge sites on a layer lattice support such as alpha, delta, or gamma $TiCl_3$ or various structures and modifications of $TiCl_3$, $MgCl_2$ or other inorganic compounds having similar layer lattice structures. The most preferred $TiCl_4$ compounds are those supported on chloride layer lattice compounds such as $MgCl_2$. Other anions may be also present, such as other halides, pseudo-halides, alkoxides, hydroxides, oxides or carboxylates, etc., providing that sufficient chloride is available for isospecific site formation. Mixed salts or double salts such as $K_2TiCl_6$ or $MgTiCl_6$ can be employed alone or in combination with electron donor compounds. Other supports besides $MgCl_2$ which are useful are hydroxychlorides, oxides or other inorganic or organic supports. The most preferred transition metal compound is $TiCl_4$ containing $MgCl_2$ especially in the presence of Lewis base (electron donor compounds).

The Lewis bases can be employed in combination with the trialkyl metal compound or with the Group IVB-VIII transition metal compound or with both components as long as they do not cause excessive cleavage of metal-carbon bonds or loss of active sites. A wide variety of Lewis bases may be used including such types as tertiary amines, esters, phosphines, phosphine oxides, phosphates (alkyl, aryl), phosphites, hexaalkyl phosphoric triamides, dimethyl sulfoxide, dimethyl formamide, secondary amines, ethers, epoxides, ketones, saturated and unsaturated heterocycles, or cyclic ethers and mixtures thereof. Typical but non-limiting examples are diethyl ether, dibutyl ether, tetrahydrofuran, ethyl acetate, methyl p-toluate, ethyl p-anisate, ethyl benzoate, phenyl acetate, amyl acetate, methyl octanoate, acetophenone, benzophenone, triethyl amine, tributylamine, dimethyl decylamine, pyridine, N-methylpiperidine, 2,2,6,6 tetramethylpiperidine and the like. The most preferred are esters of carboxylic acids such as ethylbenzoate.

Salts of group IA-IIIA metals may also be employed with the instant catalysts if they are partially or wholly solubilized by reaction with the alkyl metal components. Particularly useful are the carboxylates, alkoxides and aryloxides of magnesium and aluminum. Non-limiting examples include $Mg(OOCR'')_2$, $R''O\,Mg\,OOCR''$, $ClMgOR''$, $Mg(OR'')_2$, $R''AlOOCC_6H_5$, $R''Al(OOCR'')_2$, $R''_2AlOR''$, and the like, where $R''$ is a hydrocarbyl group. Most preferred are the carboxylate salts of magnesium and aluminum prepared in situ by reacting the organometal compounds with carboxylic acids in hydrocarbon solvents.

The improved cocatalysts of the instant invention have the general formula $R_nMR'_{3-n}$ wherein R is selected from the group consisting of a $C_3$–$C_{20}$ secondary or tertiary alkyl, cycloalkyl, alkenyl or aralkyl group, R' is selected from the group consisting of $C_1$–$C_{20}$ primary alkyl, alkenyl or aralkyl or hydride; and n = 1–3, preferably 1–2, and most preferably n = 2. Preferably, R' is $C_2$–$C_{10}$ primary alkyl or aralkyl, or hydride; most preferably, R' is $C_2$–$C_4$ primary alkyl or hydride with the restriction that not more than one hydride group may be present. The R group is preferably about a $C_4$–$C_{16}$ secondary or tertiary alkyl group or cycloalkyl group and is most preferably one which is not readily susceptible to elimination or displacement by monomer during polymerization. In addition to the simple secondary alkyl groups, other groups are also effective in which the aluminum is attached to a secondary or tertiary carbon atoms, i.e., cyclohexyl, cyclooctyl, tert-butyl, tert-amyl, s-norbornyl, and the like. The most preferred compositions have the formula $R_nAlR'_{3-n}$ in which the secondary and tertiary alkyl groups contain 4–10 carbons and n = 2. Mixtures of the cocatalysts of this invention with conventional alkyl metal cocatalysts also yields improved results.

Suitable non-limiting examples include i-$Pr_2AlEt$, s-$BuAlEt_2$, s-$Bu_2AlEt$, t-$BuAlEt_2$, t-$Bu_2AlEt$, s-$Bu_3Al$, 1,1-dimethylheptyl $AlEt_2$, s-$Bu_2Aln$-$C_{16}H_{33}$, t-$Bu_2AlCH_2C_6H_5$, s-Bu(t-Bu)$Aln$-Bu, cyclohexyl$_2AlEt$, s-pentyl Ali-$Bu_2$, t-$Bu_2AlMe$, t-$Bu_2Aln$-$C_8H_{17}$, (2-ethylcyclopentyl)$_2AlEt$, 2-(3-ethylnorbornyl)$AlEt_2$, 2-norbornyl Ali-$Bu_2$, (2-norbornyl)$_2$ Ali-Bu, acenaphthyl Ali-$Bu_2$, cyclooctyl (i-Bu)$AlH$, 3-ethyl-5-ethylidinenorbornyl $AlEt_2$, 9-i-bu-9-alumino-3,3,1-bicycononane, s-$Bu_2AlH$, t-$Bu_2AlH$, t-$Bu_2InEt$, s-$Bu_2GaEt$, and the like.

Preferred compounds include those in the above list which have the formula $R_{1-2}AlR'_{2-1}$. The most preferred compounds in the above list have the formula $R_2AlR'$.

One method of preparing these secondary alkyl aluminum compounds is to react internal olefins with Ali-$Bu_3$ or i-$Bu_2AlH$ to add Al-H across the double bond to form sec-strained ring compound, $AlR_3$ may be used to add Al-R across the double bond and obtain preferred compounds which are very resistant to displacement or elimination. Strained ring olefins include cyclopentene, norbornene, norbornadiene, ethylidene norbornene, dicylcopentadiene, and the like. This method is preferred because of raw material availability and simplicity of reaction, although this invention is not limited by the method of synthesis.

Other methods include the direct synthesis from the reactive metals and the secondary or tertiary halides, the various organometallic syntheses involving ligand exchange between Al, Ga or In compounds and secondary or tertiary alkyl metal compounds of more electropositive metals such as Group IA and IIA, and the reaction of the metals with the alkyl mercury compounds. Particularly useful is the general reaction of secondary or tertiary alkyl lithium compounds with $R'MX_2$ or $R'_2MX$ because it takes place readily in dilute hydrocarbon solutions.

Although di-secondary alkyl aluminum compounds are preferred to mono-secondary alkyl compounds, the mono-alkyl types become more effective the greater the steric bulk of the group as long as it does not interfere with active site formation or lead to decomposition under reaction conditions.

For the alkyl metal cocatalysts of this invention, the most preferred transition metal compounds contain $TiCl_4$ supported on $MgCl_2$ and one or more Lewis bases. The concentration of the transition metal in the polymerization zone is about 0.001 to about 5mM, preferably less than about 0.1mM.

The molar ratio of the trialkyl metal compound to the transition metal compound is about 0.5:1 to about 50:1, more preferably about 1:1 to about 20:1, most preferably about 5:1. The molar ratio of Lewis base to organometal compound can vary widely but is preferably about 0.1:1 to 1:1.

The catalyst system of the invention enables the process for making alpha olefin polymers having a high degree of isotactic stereoregularity to be carried out at a temperature of about 25° to about 150° C., more preferably about 40° to about 80° C., at pressures of about 1 atm. to about 50 atm. The reaction time for polymerization is about 0.1 to about 10 hours, more preferably about 0.5 to about 3 hours. Due to the high catalyst activity, shorter times and temperatures below 80° C. can be readily employed.

The reaction solvent for the system can be any inert paraffinic, naphthenic or aromatic hydrocarbon such as benzene, toluene, xylene, propane, butane, pentane, hexane, heptane, cyclohexane, and mixtures thereof. Preferably, excess liquid monomer is used as solvent. Gas phase polymerizations may also be carried out with or without minor amounts of solvent.

Typical, but non-limiting examples of $C_2-C_{20}$ alpha-olefinic monomers employed in the present invention for the manufacture of homo-, co- and terpolymers are ethylene, propylene, butene-1, pentene-1, hexene-1, octadecene-1,3-methylbutene-1, styrene, ethylidene norbornene, 1,5-hexadiene and the like and mixtures thereof. Isotactic polymerization of propylene and higher olefins is especially preferred, including block copolymerizations with ethylene.

The trialkyl metal compound and the supported transition metal compound can be added separately to the reactor or premixed before addition to the reactor, but are preferably added separately. Replacing the secondary or tertiary alkyl groups by bulky or hindered alkoxy, phenoxy or dialkylamide groups does not provide the improved catalyst activity achieved by the cocatalyst in this invention.

An alternate embodiment of the instant invention with respect to the cocatalysts $(R_nMR'_{3-n})$ is to use directly the reaction product of $R_2Mg + R'MX_2 \rightarrow R_2MR' + MgX_2$ as exemplified in U.S. Ser. No. 790,832; or $RMgX' + R'_2MX \rightarrow RMR'_2 + MgXX'$ as exemplified in U.S. Ser. No. 790,837, wherein the instant application is a continuation in part application of both U.S. Ser. No. 790,832 and 790,837 which were both filed Apr. 25, 1975.

In the case of the formation of $R_2MR'$, the metal di- or trihalide compounds which are used are selected from the group consisting essentially of a metal halide compound selected from the group consisting of $R'MX_2$, $MX_3$ and mixtures thereof, wherein M is selected from the group consisting of Al, Ga, and In, R' is selected from the group consisting of $C_1$ to $C_{20}$ primary alkyl, alkenyl or aralkyl groups or hydride; X is selected from the group consisting of chloride, bromide or a monovalent anion which cannot initiate polymerization of olefinic monomers, wherein the anion is selected from the group consisting of alkoxide, phenoxide, thioalkoxide, carboxylate, etc. and mixtures thereof. Typical but non-limiting examples are ethyl aluminum dichloride, aluminum trichloride, ethyl aluminum dibromide, ethyl chloroaluminum bromide, octyl aluminum dichloride, ethyl indium dichloride, butyl aluminum dichloride, benzyl aluminum dichloride, ethyl chloroaluminum butoxide, and mixtures thereof. Mixtures of metal halide compounds can be readily employed.

The $C_2$-$C_4$ alkyl aluminum dihalides are most preferred for high stereospecificity and the monoalkylaluminum dichlorides are most preferred.

The diorganomagnesium compound has the general formula $R_2Mg$ wherein R can be the same or different and is selected from the group consisting of $C_3$ to $C_{20}$, secondary or tertiary alkyl, cycloalkyl, aralkyl or alkenyl groups. Typical, but non-limiting examples are (s-Bu)$_2$Mg, (t-Bu)$_2$Mg or (iPr)$_2$Mg. Mixtures of diorganomagnesium compounds can be readily employed providing at least one secondary or tertiary group is present. The most preferred organic groups are secondary and tertiary alkyl groups, e.g. t-Bu or s-Bu.

The molar ratio of the alkyl metal halide compound ($R'MX_2$) to the diorganomagnesium compound is critical and is about 0.5:1 to about 2:1, more preferably about 0.7:1, and most preferably about 1:1. For the $MX_3$ compound the ratio is about 1:1 to 1:3, most preferably about 2:3. The number of moles of Lewis base can vary widely but is preferably equal to or less than the sum of the moles of the metal halide compound the diorganomagnesium compound. The molar ratio of the metal halide compound or the diorganomagnesium compound to the transition metal compound is less than about 50:1 and more preferably less than about 20:1.

The metal halide compound and diorganomagnesium compound can be added separately to the reactor containing the transition metal compound but are preferably premixed before addition to the reactor. Employing either the metal halide compound or the diorganomagnesium compound alone with the transition metal compound does not provide the improved catalyst efficiency and stereospecificity as envisioned in this application. In order to attain this, it is necessary to employ both the metal halide compound and diorganomagnesium compound in combination with the transition metal compound in the critical proportions as previously defined. The concentration of the transition metal in the polymerization zone is about 0.001 to about 5 mM, preferably less than about 0.1 mM.

In the case of the formation of $RMR_2'$, the metal alkyl compounds which are used are selected from the group consisting essentially of a metal alkyl compound selected from the group consisting of $R'_2MX$ or $R'_3M$ and mixtures thereof, wherein M is selected from the group consisting of Al, Ga and In, R' is selected from the group consisting of $C_1$ to $C_{20}$ primary alkyl, alkenyl, aralkyl or hydride groups; X is selected from the group consisting of a monovalent anion which cannot initiate polymerization of olefins, such as F, Cl, Br, OR", SR", and OOCR", wherein R" is selected from the group consisting of $C_1$ to $C_{20}$ alkyl, branched alkyl, cycloalkyl, aryl, naphthenic, aralkyl and alkenyl groups, X is more preferably Cl or Br and most preferably Cl. Typical but non-limiting examples are diethyl aluminum chloride, aluminum triethyl, diethylaluminum bromide, diethylaluminum iodide, diethylaluminum benzoate, diisobutylaluminum hydride, dioctylaluminum chloride, diethylgallium butoxide, diethylindium neodecanoate, triethylindium, dibenzylaluminum chloride and mixtures thereof. Mixtures of metal alkyl compounds can be readily employed. The $C_2$–$C_4$ alkyl aluminum compounds are preferred for high stereospecificity, and the dialkyl aluminum chlorides are most preferred.

The mono-organomagnesium compound has the general formula RMgX wherein R is selected from the group consisting of $C_3$ to $C_{20}$ secondary or tertiary alkyl, cycloalkyl, aralkyl or alkenyl groups. X is selected from the group consisting of an anion which cannot initiate polymerization of olefins, such as Cl, Br, OR", SR", and OOCR", wherein R" is selected from the group consisting of $C_1$ to $C_{20}$ alkyl, branched alkyl, cycloalkyl, naphthenic, aryl, aralkyl, allyl and alkenyl groups. Typical, but non-limiting examples are s-BuMgCl, t-BuMgCl, s-BuMgOOCC$_6$H$_5$, or s-BuMgOC$_{15}$H$_{31}$, and mixtures thereof. Mixtures of organomagnesium compounds can be readily employed. The most preferred X groups are OR" and OOCR" and the most preferred R groups are secondary or tertiary alkyls.

The molar ratio of the organomagnesium RMgX compound to the metal alkyl compound ($R'_2MX$ or $R'_3M$) is about 2:1 to about 1:2, most preferably about 1:1. The number of moles of Lewis base can vary widely but is preferably equal to or less than the sum of the moles of the metal alkyl compound and the organomagnesium compound. The molar ratio of the metal alkyl compound or the organomagnesium compound to the transition metal compound is less than about 20:1 and more preferably less than about 10:1.

The metal alkyl compound ($R'_2MX$ or $R'_3M$) and organomagnesium compound RMgX can be added separately to the reactor containing the transition metal compound but are preferably premixed before addition to the reactor. Employing either the metal alkyl compound or the organomagnesium compound alone with the transition metal compound does not provide the improved catalyst efficiency and stereospecificity as envisioned in this application. In order to attain this, it is necessary to employ both the metal alkyl compound and organomagnesium compound in combination with the transition metal compound in the proportions previously defined. The concentration of the transition metal in the polymerization zone is about 0.001 to about 5mM, preferably less than about 0.1mM.

DETAILED DESCRIPTION OF THE PREFERRED EMBODIMENTS

The advantages of the unique and novel catalyst system and the novel process for the alpha-olefin polymerizations of the present instant invention can be more readily appreciated by reference to the following examples and tables.

EXAMPLE 1

An aluminum alkyl compound containing both sec-butyl and ethyl groups was prepared by mixing equimolar amounts of (sec-butyl)$_2$Mg.0.16 Et$_2$O and ethyl aluminum dichloride in heptane, heating to 65° C., 15 min., separating the magnesium chloride solids and vacuum stripping the clear solution. NMR analysis indicated the composition sBu$_2$AlEt.0.45Et$_2$O. Metals analysis showed that only 0.50% Mg was present in this fraction.

The above liquid alkyl aluminum compound (0.2 g) was used as cocatalyst with 0.2 g catalyst prepared by reacting anhydrous MgCl$_2$ (5 moles) with TiCl$_4$.C$_6$H$_5$COOEt (1 mole) in a ball mill 4 days, followed by a neat TiCl$_4$ treat at 80° C., 2 hours, washed with heptane and vacuum dried. The catalyst contained 2.68% Ti. Propylene was polymerized in 500 ml n-heptane at 65° C., 1 hour at 765–770 mm. Polymerization rate was 130 g/g catalyst/hour and the polymer insoluble in boiling heptane = 97.6%.

EXAMPLE 2

Three alkyl aluminum compounds containing sec-butyl groups were prepared by reacting the proper stoichiometric amounts of sec-butyllithium in heptane with either ethyl aluminum dichloride or diethyl aluminum chloride, heating to boiling, filtering the insoluble LiCl, and vacuum stripping the clear solutions. Nearly theoretical yields were obtained of s-BuEtAlCl (A), s-Bu$_2$EtAl (B) and s-BuEt$_2$Al (C). Compositions were established by $^1$H and $^{13}$C NMR and by G.C. analysis of the alkyl fragments.

Polymerizations were carried out as in Example 1 using 1 mmole aluminum alkyl compound and 0.2 g of the supported TiCl$_4$ catalyst. The results summarized in Table I are compared to those obtained using the control ethyl aluminum compounds. In all three runs with sec-butyl alkyls, both activity and stereospecificity (heptane insolubles) were higher than those obtained with the conventional ethyl aluminum compounds. The trialkyls were far superior to the dialkyl aluminum chlorides and the di-sec-butyl aluminum ethyl was clearly superior to the mono-sec-butyl aluminum diethyl compound

TABLE I

| Run | Al Alkyl | Rate g/g Cat/hour | % HI |
|---|---|---|---|
| A | Et$_2$AlCl control | 48.9 | 68.0 |
| B | s-Bu$_{1.07}$EtAlCl$_{EtAlCl 64.6}$ | 79.1 | |
| C | Et$_3$Al control | 344 | 83.1 |
| D | s-BuEt$_2$Al | 380 | 90.3 |
| E | s-Bu$_2$EtAl | 357 | 93.0 |

EXAMPLE 3

Sec-pentyl aluminum diisobutyl was prepared by reacting 19.57 g i-Bu$_2$AlH with 75 ml pentene-2 in a glass lined 300 cc bomb at 135°–140° C. for 16 hours, then 150° C. for 7 hours. The solution was vacuum stripped at 25° C., yielding 28.1 g of the neat sec-pentyl aluminum compound.

Propylene was polymerized as in Example II using 0.212 g (1 mmole) sec-pentyl aluminum diisobutyl as cocatalyst. Polymerization rate was 383 g/g Cat/hr and % HI = 92.7. Comparison with AlEt$_3$ control (Ex. II, Run C) shows that the sec-pentyl aluminum compound gave substantial improvement, particularly in stereospecificity.

EXAMPLE 4

The alkyl metal cocatalysts of the invention are particularly advantageous in having a much smaller effect of concentration (or alkyl metal/Ti) on stereospecificity, thereby simplifying plant operation and permitting better control of product quality. The results are summarized in Table II for di-sec-butyl aluminum ethyl in contrast to AlEt$_3$ using the propylene polymerization procedure of Example 2.

TABLE II

| Run | Al Alkyl | Conc., mM | Rate | % HI |
|---|---|---|---|---|
| F | s-Bu$_2$AlEt | 2 | 357 | 93.0 |
| G | s-Bu$_2$AlEt | 4 | 484 | 83.4 |
| H | AlEt$_3$ Control | 2 | 344 | 83.1 |
| I | AlEt$_3$ Control | 4 | 290 | 64.9 |

The above examples illustrate that trialkyl aluminum compounds containing at least one secondary alkyl group are superior cocatalysts in Ziegler-type polymerizations of alpha-olefins and that di-secondary alkyl aluminum compounds are preferred.

EXAMPLE 5

Various secondary norbornyl aluminum n-alkyl compounds were prepared by reacting the stoichiometric proportions of a norbornene compound with either i-Bu$_2$AlH or AlEt$_3$ at elevated temperatures and removing unreacted materials by vacuum stripping. Structures were shown by $^1$H and $^{13}$C NMR to be the expected addition products of Al-H or Al-Et across the norbornene double bond. These mono and di-secondary alkyl aluminum compounds were used in propylene polymerization following the procedure of Example 2.

TABLE III

| Run | Al Alkyl | Rate | % HI |
|---|---|---|---|
| J | 2-Norbornyl AliBu$_2$* | 344 | 90.2 |
| K | (2-Norbornyl)$_2$AliBu* | 247 | 91.8 |
| L | 3-Ethyl-2-norbornyl AlEt$_2$* | 322 | 92.5 |
| M | 3-Ethyl-5-ethylidine-2-norbornyl AlEt$_2$* | 247 | 93.7 |

Comparison with the AlEt$_3$ control (Run C, Example II) shows that all of the secondary norbornyl aluminum alkyls gave markedly higher heptane insolubles while retaining high activity.

EXAMPLE 6

Sec-alkyl aluminum hydrides also give improved results compared to the closely related primary alkyl aluminum hydride (i-Bu$_2$AlH), following the procedure of Example 2.

TABLE IV

| Run | Al Alkyl | Rate | % HI |
|---|---|---|---|
| N | i-Bu$_2$AlH control | 456 | 83.1 |
| O | s-Bu$_{2.6}$AlH$_{0.4}$ | 462 | 85.8 |
| P* | AlEt$_3$ control | 241 | 82.3 |
| Q* | iBu$_3$Al control | 264 | 89.3 |
| R* | s-Bu$_{2.6}$AlH$_{0.4}$ | 284 | 90.7 |
| S* | s-Bu$_{2.3}$AlH$_{0.7}$ | 223 | 90.1 |

Run O using sec-butyl groups gave higher activity and stereospecificity than Run N using the closely related, but primary, isobutyl groups. Improved results are also seen versus the AlEt$_3$ control using the same supported titanium catalyst (Example 2, Run C).

Runs R and S show substantially higher heptane insolubles using two different sec-butyl aluminum hydrides compared to control Runs P and Q using AlEt$_3$ and iBu$_3$Al with the same catalyst.

EXAMPLE 7

The procedure of Example 2 was followed except that various Lewis bases were mixed with the aluminum alkyl solution before charging to the reactor.

TABLE V

| Run | Al Alkyl | mmoles Base | Rate | % HI |
|---|---|---|---|---|
| T | AlEt$_3$ control | 0.16 Et$_2$O | 358 | 84.7 |
| U | s-Bu$_2$AlEt | 0.16 Et$_2$O | 289 | 94.4 |
| V | t-Bu$_2$AlEt | 0.1 Me p-toluate | 327 | 94.0 |
| W | t-Bu$_2$AlEt | 0.3 Et p-anisate | 79 | 97.3 |
| X | t-Bu$_2$AlEt | 0.9 Et$_2$O | 56 | 98.0 |
| Y | t-BuAlEt$_2$ | 0.9 Et$_2$O | 101 | 97.1 |
| Z* | t-Bu$_2$AlEt | 0.2 acetophenone | 196 | 94.2 |
| AA* | t-Bu$_2$AlEt | 0.2 ethylacetate | 74 | 97.6 |

The improved stereospecificities obtained with the cocatalysts of this invention are further increased by the addition of Lewis bases (Runs U-AA versus control runs T and Example 2, Run C). At the higher amounts of base, 97–98% HI was obtained, which is sufficiently high to eliminate the need for rejection of atactic polymer and greatly simplify the process. Activity is decreased somewhat, but it is still 3–5 times that of the Et$_2$AlCl/TiCl$_3$.0.33AlCl$_3$ commercial catalyst (rate = 20, HI = 93). At somewhat lower base concentrations, activity is 10–20 times higher than the commercial catalyst while still achieving 1–2% higher heptane insolubles.

EXAMPLE 8

Following the procedures of Example 2 and Example 7, improved stereospecificity is also obtained using t-Bu$_2$InEt cocatalyst.

EXAMPLE 9

The procedure of Example 6, Runs P-S was followed except that 9-i-Bu-9-alumino-3,3,1-bicyclononane was used as cocatalyst. Polymerization rate = 97.5 g/g catalyst/hour; HI = 85.1%.

EXAMPLE 10

The procedure of Example 9 was followed except that t-Bu$_2$Al (n-octyl) was used as cocatalyst. The rate was 212 g/g catalyst/hour; HI = 93.0%.

EXAMPLE 11

Polymerizations were carried out in a 1 liter baffled resin flask fitted with an efficient reflux condenser and a high speed stirrer. In a standard procedure for propylene polymerizations, 475 ml n-heptane (<1 ppm water)

containing 10 mmole Et$_2$AlCl (1.20 g), or the mixture of cocatalysts, was charged to the reactor under dry N$_2$, heated to reaction temperature (65° C.) and saturated with pure propylene at 765 mm pressure. The TiCl$_3$ (1.00 g) (6.5 mmole) was charged to a catalyst tube containing a stopcock and a rubber septum cap. Polymerization started when the TiCl$_3$ was rinsed into the reactor with 25 ml n-heptane from a syringe. Propylene feed rate was adjusted to maintain an exit gas rate of 200–500 cc/min at a pressure of 765 mm. After one hour at temperature and pressure, the reactor slurry was poured into one liter isopropyl alcohol, stirred 2–4 hours, filtered, washed with alcohol and vacuum dried.

The TiCl$_3$ was prepared by reduction of TiCl$_4$ with Et$_2$AlCl followed by treatment with diisopentyl ether and TiCl$_4$ under controlled conditions, yielding a high surface area delta TiCl$_3$ having low aluminum content.

The sec-butyl magnesium in Runs B, D and E was obtained from Orgmet and contained 72% non-volatile material in excess of the s-Bu$_2$Mg determined by titration. IR, NMR and GC analyses showed the presence of butoxide groups and 0.07 mole diethyl ether per s-Bu$_2$Mg. A second sample of (s-Bu)$_2$Mg was used in Runs G and I. It was substantially pure s-Bu$_2$Mg but contained 0.33 mole diethyl ether per s-Bu$_2$Mg (Table VI).

TABLE VI

| Run | g TiCl$_3$ | Mmoles EtAlCl$_2$ | (s-Bu)$_2$Mg | Et$_2$AlCl | Rate g/g/hour | % HI |
|---|---|---|---|---|---|---|
| A(Control) | 1$^{(a)}$ | 0 | 0 | 10 | 33 | 95.2 |
| B | 1$^{(a)}$ | 5 | 5 | 0 | 152 | 52.6 |
| C(Control) | 1$^{(b)}$ | 0 | 0 | 10 | 85 | 96.3 |
| D | 0.2$^{(b)}$ | 0.4 | 0.2 | 1.6 | 123 | 88.0 |
| E | 0.2$^{(b)}$ | 2 | 2 | 0 | 210 | 49.2 |
| F(Control) | 1$^{(c)}$ | 0 | 0 | 5 | 8 | 79.5 |
| G | 1$^{(c)}$ | 2.5 | 2.5 | 0 | 36 | 57.6 |
| H(Control) | 1$^{(d)}$ | 0 | 0 | 10 | 20 | 91.7 |
| I | 0.2$^{(d)}$ | 1 | 1 | 0 | 200 | 57.4 |

(a) and (b) were different preparations of low aluminum TiCl$_3$ catalysts.
(c) Stauffer HA grade TiCl$_3$ (hydrogen-reduced, dry ball.milled).
(d) Stauffer AA grade TiCl$_3$.0.33 AlCl$_3$ (aluminum-reduced, dry bal milled).

Comparison of runs B, D, E, G and I with their respective control runs A, C, F and H shows that each type of TiCl$_3$ catalyst the novel cocatalyst combination gave 2–10 times higher activity than the customary Et$_2$AlCl cocatalyst.

The percent heptane insolubles (% HI) decreased substantially using the new cocatalysts. Thus, these high activity catalysts are attractive for making low crystallinity homopolymers of propylene and higher alpha olefins. They are particularly attractive for making thermoelastic polymers and amorphous copolymers and terpolymers for elastomers.

EXAMPLE 12

A titanium catalyst containing MgCl$_2$ was prepared by dry ball milling 4 days a mixture of anhydrous MgCl$_2$ (1 mole), TiCl$_4$ (1 mole) and δ-TiCl$_3$ (0.1 mole). Propylene was polymerized using the conditions in Example 11, Run B and the quantities shown in Table VIII. Activity with the cocatalysts of this invention (Run L) was intermediate between those of the AlEt$_3$ and AlEt$_2$Cl controls (Runs J and K), but the stereospecificity as shown by % HI was much higher than the controls. The large increase in % HI obtained with this MgCl$_2$-containing catalyst is in contrast to the results in Example 1 using TiCl$_3$ catalysts in which activity increased sharply but % HI decreased.

TABLE VIII

| Run | Catalyst | Alkyl Metals | Rate g/g Cat/hr | % HI |
|---|---|---|---|---|
| J(Control) | 1 | 10 AlEt$_3$ | 79 | 54.4 |
| K(Control) | 1 | 10 AlEt$_2$Cl | 18 | 35.8 |
| L | 0.2 | 1 AlEtCl$_2$ + 1 (s-Bu)$_2$Mg | 42 | 81.0 |

EXAMPLE 13

A titanium catalyst was prepared by dry ball milling 4 days a mixture of 5 MgCl$_2$, 1 TiCl$_4$ and 1 ethyl benzoate, heating a slurry of the solids in neat TiCl$_4$ 2 hours at 80° C., washing with n-heptane and vacuum drying. The catalyst contained 3.78% Ti.

Propylene was polymerized following the procedure of Example 11, Run B except that supported catalyst was used. As shown in Table VIII, all the control runs (M through S) gave substantially lower activity and/or % HI than the AlEtCl$_2$ + s-Bu$_2$Mg combination (Run T) or AlCl$_3$ + s-Bu$_2$Mg (Run U).

If the new cocatalysts simply reacted as the separate alkyl metal compounds, the results should have been like Runs M + Q. If the new cocatalysts simply reacted according to the equation: AlRCl$_2$ + R$_2$Mg→AlR$_2$Cl + RMgCl, then the results should have been like Runs N + P. However, the results in Run T and U are dramatically better, showing the completely unexpected formation of R$_2$AlR' as previously defined.

A much smaller synergistic effect was obtained by combining AlEt$_2$Cl + s-Bu$_2$Mg (Run S), but the results were poorer than those obtained with AlEt$_3$. Combining s-Bu$_2$Mg with AlEt$_3$ (Run R) destroyed the activity shown by AlEt$_3$ alone (Run O). Thus, the outstanding results were obtained only when R$_2$Mg was combined with RAlCl$_2$ or AlCl$_3$.

TABLE VIII

| Run | Catalyst | Mmoles Al Cpd | Mmoles Mg Cpd | Time Hrs. | Rate g/g Cat/hr | % HI |
|---|---|---|---|---|---|---|
| M(Control) | 0.2 | 1 AlEtCl$_2$ | — | 0.5 | 0 | — |
| N(Control) | 0.2 | 1 AlEt$_2$Cl | — | 1 | 47 | 61.1 |
| O(Control) | 0.2 | 1 AlEt$_3$ | — | 1 | 326 | 82.6 |
| P(Control) | 0.2 | — | 0.83 s-Bu MgCl | 0.25 | 0 | — |
| Q(Control) | 0.2 | — | 0.83 (s-Bu)$_2$Mg | 0.25 | 0 | — |
| R(Control) | 0.2 | 1 AlEt$_3$ | 0.83 (s-Bu)$_2$Mg | 0.25 | — | — |
| S(Control) | 0.2 | 1 AlEt$_2$Cl | 0.83 (s-Bu)$_2$Mg | 1 | 165 | 80.5 |
| T | 0.2 | 1 AlEtCl$_2$ | 0.83 (s-Bu)$_2$Mg | 1 | 367 | 91.9 |

TABLE VIII-continued

| Run | Catalyst | Mmoles Al Cpd | Mmoles Mg Cpd | Time Hrs. | Rate g/g Cat/hr | % HI |
|---|---|---|---|---|---|---|
| U | 0.2 | 1 AlCl$_3$ | 0.83 (s-Bu)$_2$Mg | 1 | 220 | 88.9 |

EXAMPLE 14

The procedure of Example 13 was followed using 0.2 g of the supported TiCl$_4$ catalyst together with (s-Bu)$_2$Mg and variations aluminum compounds.

TABLE IX

| Run | Mmoles Al Cpd | Mmoles (s-Bu)$_2$Mg | Time Hrs. | Rate g/g Cat/hr | % HI |
|---|---|---|---|---|---|
| V | 0.4 AlEtCl$_2$ | 0.33 | 1 | 60 | 94.5 |
| W | 1 AlEtCl$_2$ | 0.41 | 1 | 64 | 76.6 |
| X | 0.5 AlEtCl$_2$ | 0.83 | 1 | 260 | 87.2 |
| Y | 0.5 AlCl$_3$ | 0.83 | 2 | 136 | 90.7 |
| Z | 1 AlEtCl$_2$ + 1 AlEt$_2$Cl | 0.83 | 1 | 404 | 86.9 |
| AA | 1 AlEtBr$_2$ | 0.83 | 1 | 220 | 88.9 |
| BB | 1 AlC$_8$H$_{17}$Cl$_2$ | 0.83 | 1 | 425 | 88.0 |
| CC | 0.63 Et ClAlN(iPr)$_2$ | 0.53 | 1 | 6 | — |
| DD | 1 Br$_2$AlN(iPr)$_2$ | 0.83 | 1 | 16 | — |

Comparison of Runs V, W and X shows that the highest % HI is obtained at approximately equimolar amounts of RAlCl$_2$ and R$_2$Mg (Run V), that a large excess of RAlCl$_2$ is undesirable (Run W) and that a small excess of R$_2$Mg increases activity (Run X). Activity also increased upon addition of AlEt$_2$Cl to the AlEtCl$_2$-(s-Bu)$_2$Mg system (Run Z). The remainder of the experiments show that the dibromide may be used in place of dichloride (Run AA), that long chain alkyl aluminum compounds are very effective (Run BB), but that dialkyl amide groups on the aluminum compound destroy catalyst activity (Runs CC and DD).

EXAMPLE 15

The procedure of Example 13, Run T was followed except that Lewis bases were also added to the AlEtCl$_2$-(s-Bu)$_2$Mg cocatalysts.

Addition of Lewis bases causes a decrease in catalyst activity until it becomes zero at a mole ratio of one strong base per mole of RAlCl$_2$ + R$_2$Mg (Table X).

TABLE X

| Run | Mmoles Base/ (sec Bu)$_2$Mg | Time, Hrs | Rate g/g Cat/hr | % HI |
|---|---|---|---|---|
| EE | 0.24 OCOOEt[a] | 0.5 | 174 | 94.3 |
| FF | 0.5 Et$_3$N[b] | 1 | 62 | 85.5 |
| GG | 2 Diisopentyl ether | 1 | 127 | 78.8 |
| HH | 2 Tetrahydrofuran[c] | 1 | 0 | — |

[a]Added to the (s-Bu)$_2$Mg
[b]Premixed total catalyst in 100 ml n-heptane at 65° C., 5 min. before adding Et$_3$N
[c]Added to premixed AlEtCl$_2$-(s-Bu)$_2$Mg As shown in Run EE, small quantities of Lewis base are effective in improving isotacticity (94.3% HI vs. 91.9 in Run T) while maintaining high activity (nearly 9 times the conventional AlEt$_2$Cl/TiCl$_3$.0.33 AlCl$_3$ catalyst, Example 11, Run H).

EXAMPLE 16

The procedure of Example 13, Run T was followed except that xylene diluent was used for polymerization instead of n-heptane. Activity was 676 g/g Cat/hr and the polymer gave 90.9% heptane insolubles. The polymer was precipitated with 1 liter isopropyl alcohol, filtered, dried and analyzed for metals. Found 13 ppm Ti and 83 ppm Mg. Thus at high monomer concentration and longer polymerization times the high efficiency would yield very low catalyst residues without deashing.

EXAMPLE 17

The procedure of Example 13, Run T was followed except that polymerization was carried out at 50° C. and 80° C. Both polymerization rate and % HI decreased with increasing temperature, with the largest decrease taking place above 65° C. (Table XI).

TABLE XI

| Run | Polymer Temp, °C. | Time Hours | Rate | % HI |
|---|---|---|---|---|
| II | 50 | 1 | 474 | 90.4 |
| T | 65 | 1 | 367 | 91.9 |
| JJ | 80 | 0.5 | 148 | 74.6 |

EXAMPLE 18

Propylene was polymerized at 690 kPa pressure in a stirred autoclave at 50° C., 1 hour. A second preparation of MgCl$_2$-containing TiCl$_4$ catalyst (2.68% Ti), made as in Example 13 except that TiCl$_4$-ethylbenzoate complex was preformed, was used in combination with AlRCl$_2$-R$_2$Mg. High stereospecificity was obtained at high rates and catalyst efficiencies (Table XII).

TABLE XII

| Run | g Cat | Mmoles AlEtCl$_2$ | Mmoles (s-Bu$_2$)Mg | Rate | % HI |
|---|---|---|---|---|---|
| KK | 0.10 | 0.5 | 0.5 | 1672 | 88.8 |
| LL | 0.10 | 0.25 | 0.25 | 696 | 95.0 |

EXAMPLE 19

The procedure of Example 13, Run T was followed except that the catalyst of Example 18 was used and 1 mmole di-n-hexyl magnesium was used instead of 0.83 mmole (s-Bu)$_2$Mg. The (n-hexyl)$_2$Mg in Soltrol #10 was obtained from Ethyl Corporation (Lot No. BR-516). Polymerization rate was 551 g/g Cat/hr but the polymer gave 76.9% HI which is unexceptable. Thus n-alkyl magnesium compounds do not yield the high stereospecificty of the secondary and tertiary alkyl compounds of this invention.

EXAMPLE 20

The procedure of Example 15 Run EE was followed except that a new pure sample of (sec-Bu)$_2$Mg was used with 0.33 mole diethyl ether instead of ethyl benzoate and the reaction time was 1 hr. Rate was 268 g/g Cat/hr and % HI=92.2.

EXAMPLE 21

A catalyst was prepared by dry ball milling 4 days a mixture of 10 MgCl$_2$, 2 TiCl$_4$, 2 ethylbenzoate and 1 Mg powder, heating the solids in neat TiCl$_4$ 2 hours at 80° C., washing with n-heptane and vacuum drying (Ti = 2.16%).

Propylene was polymerized 1 hour at 65° C. and atmospheric pressure using 0.20 g of this catalyst under the conditions of Example 13, Run T except only 0.4 mmole (s-Bu)$_2$Mg and 0.4 mmole AlEtCl$_2$ was used. Rate was 240 g/g Cat/hr and % HI = 93.9.

EXAMPLE 22

A catalyst was prepared by dry ball milling 1 day a mixture of 5 MgCl$_2$ and 1 ethylbenzoate, adding 1 TiCl$_4$ and milling an additional 3 days, then treating the solids with neat TiCl$_4$ 2 hours at 80° C., washing with n-heptane and vacuum drying (3.44% Ti).

Propylene was polymerized following the procedure of Example 13, Run T, except that 1 mmole (s-Bu)$_2$Mg was used instead of 0.83 mmole. Rate was 298 g/g Cat/hr and % HI = 89.

and vacuum drying. The catalyst contained 3.78% Ti. Portions of this catalyst preparation were used in the experiments shown in Table XIV. Various control runs are shown for comparison with the cocatalysts of this invention (Runs A-F).

The sec-butyl magnesium was obtained from Orgmet and contained 72% non-volatile material in excess of the s-Bu$_2$Mg determined by titration. IR, NMR and GC analyses showed the presence of butoxide groups and 0.07 mole diethyl ether per s-Bu$_2$Mg. The various s-BuMgX compounds were prepared directly by reacting an equimolar amount of ROH, RSH, RCOOH, etc. with the s-Bu$_2$Mg.

TABLE XIV (0.2 g Catalyst, 500 ml n-C$_7$, 65° C., 1 hr.)

| Run | Mmoles Al Cpd | Mmoles Mg Cpd | Mmoles Base | Rate g/g Cat/hr | % HI |
|---|---|---|---|---|---|
| Control | 1 AlEt$_2$Cl | — | — | 47 | 67.1 |
| Control | 1 AlEt$_3$ | — | — | 326 | 82.6 |
| Control | 1 AlEt$_2$Cl | 0.83 (s-Bu)$_2$Mg | — | 165 | 80.5 |
| Control | 1 AlEt$_3$ | 0.83 (s-Bu)$_2$Mg | — | 6 | — |
| Control | — | 0.83 (s-Bu)$_2$Mg | — | 0 | — |
| Control | — | 0.83 s-BuMgCl | — | 0 | — |
| A | 1 AlEt$_2$Cl | 1 s-Bu Mg OOCO | — | 165 | 95.2 |
| B | 1 AlEt$_2$Cl | 1-s-Bu Mg OC$_{15}$H$_{31}$ | — | 276 | 91.7 |
| C | 1 AlEt$_2$Cl | 1 s-Bu MgOC$_2$H$_5$ | — | 261 | 91.4 |
| D | 1 AlEt$_2$Cl | 1 s-Bu MgSC$_{12}$H$_{25}$ | — | 310 | 93.2 |
| E | 1 AlEt$_2$Cl | 0.83 s-Bu MgCl | 1 Et$_3$N | 100 | 94.6 |
| F | 1 Et$_2$AlOOCO + 1 Et (s-Bu)AlCl | 1 s-BuMgCl | — | 351 | 90.5 |

EXAMPLE 23

Following the procedure in Example 18, two catalysts were made at different Mg/Ti ratios. Catalyst A was made with 1 MgCl$_2$ + 1 TiCl$_4$-ethylbenzoate and B (2.10% Ti) was made with 10 MgCl$_2$ + 1 TiCl$_4$-ethylbenzoate complex. Propylene was polymerized following the procedure of Example 13, Run T (Table XIII).

TABLE XIII

| Run | g Cat | Mmoles AlEtCl$_2$ | Mmoles (s-Bu)$_2$Mg | Rate | % HI |
|---|---|---|---|---|---|
| MM | 0.107A | 2 | 1.66 | 60 | 72.0 |
| NN | 0.316B | 0.25 | 0.25 | 512 | 60.4 |
| OO[a] | 0.316B | 0.25 | 0.25 | 124 | 84.2 |

[a] Added 0.25 mmole triethylamine to the alkyl metal cocatalysts.

These results show that the 1:1 and 10:1 MgCl$_2$: TiCl$_4$ catalyst preparations were not as effective as the 5:1 preparations in preceding examples.

EXAMPLE 24

Polymerizations were carried out in a 1 liter baffled resin flask fitted with a reflux condenser and stirrer. In a standard procedure for propylene polymerizations, 475 ml n-heptane (<1 ppm water) containing the alkyl metal cocatalysts was charged to the reactor under N$_2$, heated to reaction temperature (65° C.) while saturating with propylene at 765 mm pressure. The powdered transition metal catalyst was charged to a catalyst tube such that it could be rinsed into the reactor with 25 ml n-heptane from a syringe. The propylene feed rate was adjusted to maintain an exit gas rate of 200–500 cc/min. After one hour at temperature and pressure, the reactor slurry was poured into 1 liter isopropyl alcohol, stirred 2-4 hours, filtered, washed with alcohol and vacuum dried.

A titanium catalyst supported on MgCl$_2$ was prepared by combining 5 MgCl$_2$, 1 TiCl$_4$ and 1 ethylbenzoate, dry ball milling 4 days, heating a slurry of the solids in neat TiCl$_4$ 2 hours at 80° C., washing with n-heptane Compared to the control runs, which gave either low activity or low percent heptane insolubles (% HI), the new cocatalyst combinations gave high activity and stereospecificity (>90% HI).

EXAMPLE 25

A second catalyst preparation 2.68% Ti was made following the procedure of Example 24 except that a preformed 1:1 complex of TiCl$_4$.OCOOEt was used. In Runs G and H, the s-BuMgCl.Et$_2$O was obtained by vacuum stripping an ether solution of the Grignard reagent. In Run I, the n + s BuMgOOCC$_6$H$_5$ was made by reacting pure (n + s Bu)$_2$Mg with benzoic acid. Propylene polymerizations were carried out as in Example 24 (Table IV).

TABLE XV

| Run | Mmoles Al Cpd | Mmoles Mg cpd | Mmoles Base | Rate g/g Cat/hr. | % HI |
|---|---|---|---|---|---|
| G | 1 AlEtCl$_2$ | 1 s-BuMgCl | 1 Et$_2$O | 0 | — |
| H | 1 AlEt$_2$Cl | 1 s-BuMgCl | 1 Et$_2$O | 132 | 93.1 |
| I | 1 AlEt$_3$ | 1 n + s-bu MgOOCC$_6$H$_5$ | — | 123 | 89.7 |

Run G shows that monoalkyl aluminum compounds are not effective in combination with the monoorganomagnesium compounds in this invention. In contrast, Example 13, Run T, shows that such monoalkyl aluminum compounds are preferred when diorganomagnesium compounds are used.

Runs H and I show that dialkyl and trialkyl aluminum compounds are required with monoalkyl magnesium compounds.

EXAMPLE 26

Propylene was polymerized at 690 kPa pressure in a 1 liter stirred autoclave at 50° C. for 1 hour using the supported TiCl$_4$ catalyst of Example 25 (Table XV). The Mg compound was made as in Example 24, Run A.

TABLE XVI

| Run | g. Cat | Mmoles Mg Cpd | Mmoles AlEt$_2$Cl | Solvent | Rate | % HI |
|---|---|---|---|---|---|---|
| J | 0.05 | 0.5 s-BuMgOOC0 | 0.5 | n-C$_7$ | 1292 | 89.9 |
| K | 0.10 | 0.4 s-BuMgOOC0 | 0.4 | n-C$_7$ | 317 | 96.9 |
| L | 0.10 | 0.4 s-BuMgOOC0 | 0.4 | Xylene | 517 | 96.5 |

Comparison of Runs J and K shows that the lower alkyl metal/catalyst ratio in K gave higher heptane insolubles. Run L in xylene diluent gave higher activity than K in heptane.

EXAMPLE 27

The procedure of Example 25 was followed except that organo-magnesium compounds containing alkoxy and benzoate groups were used in combination with AlEt$_2$Cl together with diethyl ether. The s-BuMgOsBu was prepared by reacting a dilute solution of sBu$_2$Mg containing 0.33 Et$_2$O with one mole s-BuOH and used without isolation (Run M). The mixture in Run N was prepared in a similar manner by reacting 1.55 mmole n + s Bu$_2$Mg with 1.10 s-butanol, adding 0.066Et$_2$O, then adding this product to a solution of 1 benzoic acid in 275 ml n-heptane.

TABLE XVII

| Run | Mmoles Mg Cpd | Mmoles AlEt$_2$Cl | Mmoles Et$_2$O | Rate | % HI |
|---|---|---|---|---|---|
| M | 1 s-BuMgOs-Bu | 1 | ½ | 107 | 94.6 |
| N | 0.45 n+s BuMgOOC0<br>0.55 n+s BuMgOsBu<br>0.55 s BuOMgOOC0 | 1 | 0.066 | 101 | 95.9 |

Comparison with Example 25, Run H shows that superior results were obtained with smaller amounts of diethyl ether by using alkoxide and carboxylate salts instead of the chloride.

EXAMPLE 28

The procedure of Example 7, Run Z was followed except that 0.25 mmole Mg(OOCC$_6$H$_5$)$_2$ was used in place of acetophenone as the third component. The magnesium benzoate was prepared from a dilute heptane solution of benzoic acid and n+s Bu$_2$Mg. The t-Bu$_2$AlEt was added to the milky slurry of Mg(OOCC$_6$H$_5$)$_2$, charged to the reactor and heated to 65° C., 5 min., after which the supported titanium catalyst was added.

The propylene polymerization rate was 122 g/g-cat/hr and polymer HI = 97.7%.

Since many modifications and variations of this invention may be made without departing from the spirit or scope of the invention thereof, it is not intended to limit the spirit or scope thereof to the specific examples thereof.

What is claimed is:

1. An improved catalyst composition adaptable for use in alpha-olefin polymerization which comprises a mixture of:
   (a) a transition metal compound on a support, said transition metal compound selected from the group consisting of VCl$_3$, VBr$_3$, TiCl$_3$, TiCl$_4$, TiBr$_3$ and TiBr$_4$ and mixtures thereof; and
   (b) at least one alkyl metal compound having the formula:

$$R_nMR'_{3-n}$$

wherein R' is selected from the group consisting of C$_1$ to C$_{20}$ primary alkyl, primary alkenyl, and primary aralkyl groups and hydride; R is attached to M through a secondary or tertiary carbon atom and is selected from the group consisting of C$_3$ to C$_{20}$ secondary and tertiary alkyl, cycloalkyl, alkenyl and aralkyl groups, M is selected from the group consisting of aluminum, gallium and indium and n = 1 to 2, wherein said composition includes at least one Lewis base selected from the group consisting of amines, esters, phosphines, phosphine oxide, phosphates, amides, ketones and ethers, with the proviso that said Lewis base does not cause excessive cleavage of metalcarbon bonds of said R$_n$MR'$_{3-n}$ or loss of active sites, a molar ratio of said alkyl metal compound to said transition metal compound being about 0.5:1 to about 50:1.

2. The composition of claim 1 wherein said transition metal compound is TiCl$_4$.

3. The composition of claim 2, wherein said support contains MgCl$_2$.

4. The composition of claim 1, wherein said transition metal compound is TiCl$_3$.

5. The composition of claim 1, wherein said ester is a carboxylic acid ester.

6. The composition of claim 1, wherein n equals 2.

7. The composition of claim 2, further including TiCl$_3$.

8. The composition of claim 1, wherein said RMR'$_2$ is formed from the reaction product of R'$_2$MX and RMgX', wherein X is selected from the group consisting of chloride, bromide, or a monovalent anion which cannot initiate polymerization of olefinic monomers and X' is an anion which cannot initiate polymerization of olefinic monomers.

9. The composition of claim 8, wherein said transition metal compound is TiCl$_4$ containing MgCl$_2$.

10. The composition of claim 1, wherein R$_2$MR' is formed from the reaction product of R$_2$Mg and R'MX$_2$ wherein X is selected from the group consisting of chloride, bromide, or a monovalent anion which cannot initiate polymerization of olefinic monomers.

11. The composition of claim 10, wherein said transition metal compound is TiCl$_4$ containing MgCl$_2$.

12. An improved catalyst composition adaptable for use in alpha-olefin polymerization including a mixture of a Lewis base, a Group IVB to VIII transition metal compound on a support, and at least one alkyl metal compound having the formula:

$$R_nMR'_{3-n}$$

wherein R' is selected from the group comprising C$_1$ to C$_{20}$ primary alkyl, primary alkenyl and primary aralkyl groups and hydride; M is selected from the group consisting of aluminum, gallium and indium and n = 1 to 2, said Lewis base not causing excessive cleavage of metal-carbon bonds of said R$_n$MR'$_{3-n}$ or loss of active sites, wherein the improvement comprises R is attached to M through a secondary or tertiary carbon atom and being selected from the group consisting of C$_3$ to C$_{20}$ secondary and tertiary alkyl, cycloalkyl, alkenyl, or aralkyl groups.

13. The composition of claim 12, wherein said transition metal compound is a transition metal halide.

14. The composition of claim 13, wherein the halide group of said transition metal halide is selected from the group consisting of chloride or bromide and mixtures thereof.

15. The composition of claim 14, wherein the metal of said transition metal halide is selected from the group consisting of trivalent titanium, trivalent vanadium and tetravalent titanium.

16. The composition of claim 12, wherein said transition metal compound is $TiCl_4$.

17. The composition of claim 16, wherein said support contains $MgCl_2$.

18. The composition of claim 12, wherein said transition metal compound is $TiCl_3$.

19. The composition of claim 12, wherein said Lewis base is selected from the group of amines, esters, phosphines, phosphine oxides, phosphates, amides, ketones and ethers.

20. The composition of claim 17, wherein said Lewis base is selected from the group consisting of amines, esters, phosphines, phosphine oxides, phosphates, amides, ketones and ethers.

21. The composition of claim 12, wherein said Lewis base is a carboxylic acid ester.

22. The composition of claim 12, wherein n equals 1.

23. The composition of claim 12, wherein in equals 2.

24. The composition according to claim 12, wherein a molar ratio of said alkyl metal compound to said transition metal compound is about 0.5:1 to about 50:1.

25. The composition of claim 16, further including $TiCl_3$.

26. The composition of claim 14, wherein said $R_nMR'_{3-n}$ is $RMR'_2$.

27. The composition of claim 26, wherein said $RMR'_2$ is formed from the reaction product of $R'_2MX$ and $RMgX'$, wherein X is selected from the group consisting of chloride, bromide, or a monovalent anion which cannot initiate polymerization of olefinic monomers and X' is an anion which cannot initiate polymerization of olefinic monomers.

28. The composition of claim 27, wherein said transition metal compound is $TiCl_4$ containing $MgCl_2$.

29. The composition of claim 14, wherein said $R_nMR'_{3-n}$ is $R_2MR'$.

30. The composition of claim 29, wherein $R_2MR'$ is formed from the reaction product of $R_2Mg$ and $R'MX_2$ wherein X is selected from the group consisting of chloride, bromide, and a monovalent anion which cannot initiate polymerization of olefinic monomers.

31. The composition of claim 30, wherein said transition metal compound is $TiCl_4$ containing $MgCl_2$.

* * * * *